Nov. 30, 1965   G. C. NOLL ET AL   3,220,785
BALL SPACER FOR BEARINGS AND THE LIKE
Filed Feb. 28, 1963

INVENTORS
GEORGE C. NOLL
HAROLD F. MISURACA
BY
Oberlin, Maky & Donnelly
ATTORNEYS United States Patent Office 3,220,785
Patented Nov. 30, 1965

3,220,785
BALL SPACER FOR BEARINGS AND THE LIKE
George C. Noll, Elyria, and Harold F. Misuraca, Avon Lake, Ohio, assignors, by mesne assignments, to Koehring Company, Milwaukee, Wis., a corporation of Wisconsin
Filed Feb. 28, 1963, Ser. No. 261,707
6 Claims. (Cl. 308—230)

This invention relates generally as indicated to a ball spacer for bearings and the like and more particularly to such spacers for turntable ball bearings for power cranes, shovels, hoes and the like.

In such machines, there is provided a turntable ball bearing having resiliently deformable spacers between the balls thereof enabling such bearing to withstand the imposition of eccentric vertical or axial loads and horizontal thrust loads encountered in the use of such equipment. The handling of such eccentric loads and the imposition of horizontal thrust loads set up high and low load zones at diametrically opposite points of the bearing which results in a tendency for the balls alternately to crowd and spread apart. Such crowding of the balls under extreme loads creates a substantial compressive force on the ball spacers. When a plastic material such as nylon is employed for such ball spacers, extreme crowding and the resultant compressive force tends to cause such spacers to fracture radially resulting in bearing failure. Such fracturing can cause chunking and loose pieces of bearing spacer in the bearing race will prevent the balls from moving properly as aforesaid.

External bands or rings have been employed, see for example, Zeilman Patent No. 2,897,021, in an effort to minimze bearing failures as the result of radial spacer fracturing. However, once such fracturing occurs and the balls spread apart, the loose segment of the spacer can become dislodged and caught or wedged between the ball and race. Such then exposes the band or ring to contact with the ball or race surface damaging the same. Loose chunks of spacer material within the race may act as wedges or brakes inducing skiding of the balls on the raceway and consequent higher friction and wear.

It is accordingly a principal object of the present invention to provide a ball bearing spacer for the turntable bearings of power shovels, cranes and the like equipment utilizing solid, one-piece, resilient plastic spacers which will yet not fragmentize under extreme compressive ball loading.

It is another object to provide such ball spacers of one-piece nylon or like plastic material construction with non-exposed reinforcing members.

It is still another object to provide equipment of the type referred to in which the turntable bearing assembly is of extremely simple and inexpensive form with such solid one-piece plastic spacers yet which will not be subject to failures due to fragmentizing of such spacers.

Other objects and advantages of the present invention will become apparent as the following description proceeds.

To the acomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
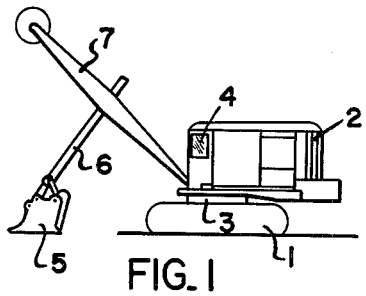
FIG. 1 is a side elevation of a power shovel employing a turntable bearing in accordance with the present invention.

Referring now more particularly to the drawing and first to FIG. 1, the power shovel shown comprises generally a carrier 1 which, for instance, may be the crawler illustrated. The superstructure 2 of the shovel is mounted on the carrier frame by means of the turntable bearing 3 which is provided with complemental bearing rings which form the race for the bearing balls. The turntable bearing 3 then supports the superstructure 2 for swinging movement about the vertical central axis of such bearing. The superstructure includes a cab 4 for the operator controlling the operation of the shovel 5 mounted on the end of dipper stick 6 which is mounted on the boom 7. Reference may be had to the aforementioned Zeilman patent for a more clear disclosure of the bearing rings and the thus formed race structure.

In digging position, as shown, the bucket 5 imposes a horizontal thrust load on the turntable bearing 3 in addition to the downward eccentric thrust load due to the weight of the superstructure and the load of material being lifted by the bucket 5. Under extreme digging conditions, it will be seen that the bucket mechanism will tend to tip the entire machine forwardly causing such downward eccentric thrust loading and spreading and crowding of the bearing balls as hereinafter described.

Figure 2:
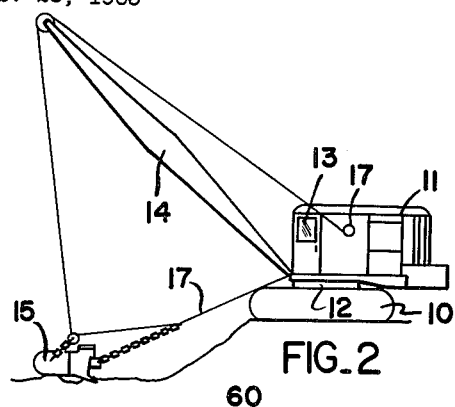
FIG. 2 is a similar side elevation of a power crane also employing a bearing incorporating the spacer of the present invention.

Referring now to FIG. 2, there is shown a dragline crane which is of similar construction to the shovel shown in FIG. 1. A crawler carrier 10 supports such crane with the superstructure 11 being mounted on the carrier frame by means of the turntable bearing 12. The superstructure 11 also includes the operator's cab 13 controlling the position of the boom 14 and the dragline bucket 15. Suitable hoisting mechanisms shown generally at 16 will be employed to raise and lower the boom 14 as well as to control the position of the bucket 15. A dragline 17 is employed to pull the bucket 15 along the ground to fill the same with the material being loaded. Here again, the bucket 15 imposes a horizontal thrust load on the turntable bearing 12 in addition to the downward eccentric thrust load due to the weight of the superstructure, including the boom and bucket, and the load of material being lifted thereby.

Whereas only a power shovel and a power crane have been illustrated as examples of application of the present invention, it will be realized that any machine employing a turntable mounted superstructure can utilize the present invention. Examples of such other machines would be military vehicles such as tanks, howitzers, and the like. Fire fighting equipment, power line inspection and repair equipment, and many other such machines employ revolving superstructures mounted on such turntable bearings.

In machines such as that shown in FIG. 1, the outer bearing ring may be in the form of a ring gear fixed to the carrier 1 and a vertical swing pinion mounted on the superstructure 2 will be in mesh with the teeth of the ring gear. The inner bearing ring will be fixed to the superstructure and rotation of the swing pinion will revolve the superstructure about the vertical axis of the turntable bearing. Both bearing rings will be provided with semi-circular grooves which mate to form the bearing race.

Under such conditions as eccentric vertical loading, as when the bucket 5 engages heavy material such as shale, rock or the like, the machine will tend to tip forwardly spreading the balls apart at the forward side of the bearing and crowding them together at the opposite side. As the balls crowd together, they will initially assume the position shown in FIG. 3 wherein adjacent balls 20 and 21 will first contact the spacers 22, interposed between each ball, adjacent the central aperture 23 therein. The spacer 22 is of a solid one-piece plastic construction and is provided with two oppositely directed spherical ball contacting surfaces 24 and 25. As shown, these surfaces are of a slightly larger radius than the radius of the balls 20 and 21 and thus initial ball contact will be at the annular edges 26 and 27 of the central opening or aperture 23.

Radially from the aperture 23, the spacer enlarges axially with the ball contacting surfaces terminating at the parallel rim faces 30 and 31 extending normal to the axis of the race. The peripheral surface of the rim portion of the spacer includes two annular planar surfaces 32 and 33 at a slight angle to each other which join at the axial center of the spacer.

Figure 3:
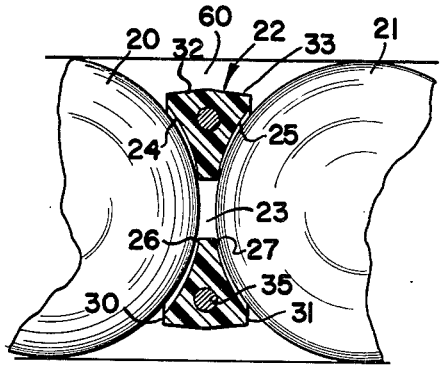
FIG. 3 is a much enlarged vertical section taken on the circumference of the toroidal raceway formed by the bearing rings illustrating the initial contact between adjacent balls and the interposed spacer.
Figure 4:
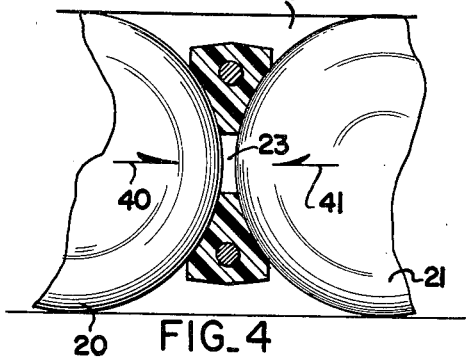
FIG. 4 is a section similar to FIG. 3 illustrating the balls and the interposed spacer under compressive loading.

Situated within the spacer shown in FIGS. 3 and 4 is an annular metal ring 35 of circular section which is centered both with respect to the center of the spacer and the center vertical plane passing therethrough. The ring is spaced substantially from the peripheral surfaces 32 and 33 of the spacer and approximately equally substantially spaced from the spherical ball contacting surfaces 24 and 25. In this manner, no part of the reinforcing ring 35 will be exposed either for ball contact or for contact with the bearing rings forming the bearing race.

Referring now to FIG. 4, when the balls 20 and 21 are placed under a crowding action, they will move in the direction of the arrows 40 and 41 causing the one-piece plastic spacer to deform initially from the aperture 23 radially outwardly until the entire ball contacting surfaces 24 and 25 engage the surfaces of the balls 20 and 21. The plastic material of the spacer will actually be caused to flow with the aperture 23 becoming somewhat smaller and material of the spacer being compressed and forced also radially outwardly. As the crowding pressure increases, the balls will contact a larger and larger area of the ball contact surfaces 24 and 25 until the entirety of such surfaces are in contact with the balls. The resilient resistance to such crowding thus increases as the balls move together.

At such loading of the balls, there will be a tendency for the plastic spacer to enlarge and the material thereof to flow radially outwardly. This places the reinforcing ring 35 under considerable tension, but such will serve as a skeleton for the spacer maintaining it in a unitary condition. Without such ring, the bearing spacer material would tend to crack radially and chunks of the spacer would become dislodged and caused to move freely within the bearing race. This would be a major source of bearing failures as aforesaid. Even if the bearing spacer does radially crack under such compressive loading, the reinforcing ring 35 will maintain the segments of the spacer in annular form and prevent such segments from becoming dislodged in the bearing race. Moreover, even if such radial cracks develop in the plastic material, the metallic ring 35 will not be exposed for contact with the ball surfaces or the interior of the bearing race.

Figure 5:
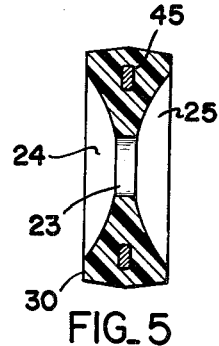
FIG. 5 is a vertical section of a bearing spacer similar to that shown in FIGS. 3 and 4, but utilizing a different reinforcing ring.

FIGS. 5 through 8 illustrate different forms of the reinforcing skeleton which may be placed within the one-piece plastic material spacer. In FIG. 5, there is illustrated a ring 45 of a rectangular sectional configuration having a substantially greater radial extent than axial extent. This configuration of reinforcing rings permits the employment of more nylon material between the bearing ball contact surfaces 24 and 25 and the metallic ring. A ring of this type may be formed from a metal stamping, but care will be taken to round or finish the edges thereof to avoid stress points in the plastic material which might induce fracturing.

Figure 6:
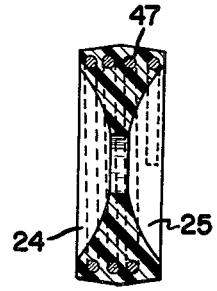
FIG. 6 is a view similar to FIG. 5 of a further form of the present invention.

In FIG. 6, there is illustrated a helical reinforcing member 47 embedded in the one-piece plastic spacer with the helix illustrated being of approximately 3½ turns. Such helix may be formed from a portion of a compression spring of suitable diameter but the spacer will be carefully molded so that there will be no exposed portions of the helix which might contact the ball surfaces or the race surfaces thus to interfer with the proper ball action.

Figure 7:
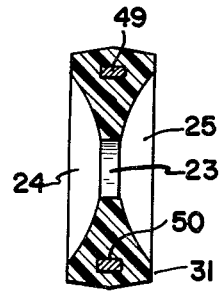
FIG. 7 is a view similar to FIGS. 5 and 6 illustrating a still further form of the present invention.

In FIG. 7, there is illustrated a ring similar to that shown in FIG. 5 embedded within the one-piece plastic spacer, but in this instance, the greater dimension of the ring is in the axial direction rather than in the radial direction. The ring 49 thus presents a substantial inner diameter surface 50 to resist the principally radially outwardly directed force which induces the spacer to chunk or crack. Again, the ring may be made by stamping or other suitable method and care will be taken to round the corners thereof to reduce stress points.

Figure 8:
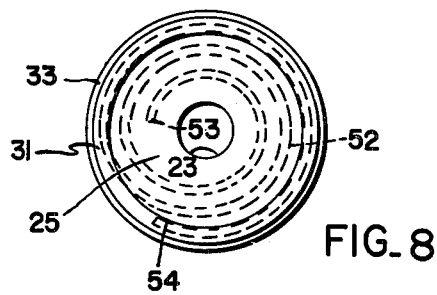
FIG. 8 is a face view of a bearing spacer illustrating yet another form of internal reinforcing member.

In FIG. 8, a further form of reinforcing skeleton is shown in the form of a convolute metal wire or rod. Such wire 52 extends from its inner end 53 on an increasing radius and terminates outwardly at its outer end 54. The convolute 52 may be centered with respect to the spacer and in a single plane normal to the axis thereof. In all of the illustrated species, the reinforcing or skeleton member may be provided with surface deformations to provide a better locking and reinforcing action within the body of plastic material.

Whereas nylon resins, such as Dupont Zytel are preferred because of the low coefficient of friction involved, other synthetic resins such as polypropylene resins or acetyl resins may also be employed. Teflon is another relatively new synthetic resin which has been found suitable for the present invention. It will, of course, be understood that the race of the bearing will be packed with grease and accordingly any plastic material of high compressive strength may be employed. Examples of such materials that may be employed in the present invention are acetal polymers and copolymers, methyl methacrylate, cellulose acetate, cellulose nitrate, polychlorotrifluoroethylene, polystyrene, glass reinforced polycarbonates, casein molding compounds, melamine-formaldehyde molding compounds, phenol-formaldehyde and phenol-furfural molding compounds, epoxies, phenolics, polyesters and polyurethane molding compounds as well as diallyl phthalate molding compounds.

For the reinforcing rings, high tensile or spring steel is preferred. It will, of course, be understood that suitable plastic materials of high tensile strength may be employed in lieu of such metal rings or reinforcing members with bond being produced between the reinforcing member and the body of the spacer.

As an example, for a turntable bearing 3 employing 2¼ inch diameter balls, nylon spacers 22 may have a central opening 23 of about ⅜ inch diameter and such openings will contain lubricant. The ball seat or contact surfaces 24 and 25 will have a radius from about 1.130 inches to about 1 and 7/16 inch. The annular end faces may have a radial thickness of approximately ⅛ to 5/32 of an inch. The bearing 3 may have a mean race diameter of about 3 feet 10 inches and will accommodate 59 balls, 18 of which are capable of safely handling in excess of about 70,000 pounds since the up and down loads on the bearing are each distributed over about 23 percent of the number of such balls.

It can now be seen that the bearing balls 20 and 21, within the toroidal raceway 60 of the turntable bearing 3 will be properly held apart by an easily formed molded one-piece plastic spacer which will yet incorporate a skeleton or reinforcing member which will preclude the spacer from cracking radially or disintegrating to cause bearing failures. The reinforcing members can be incorporated in the spacers when they are molded and the completed spacer will not have any exposed metallic surfaces which would contact the balls or the inner surface of toroidal raceway 60 causing undue wear or otherwise inducing a bearing failure.

Other modes of applying the principle of the invention may be employed, change being made as regards the details described, provided the features stated in any of the following claims or the equivalent of such be employed.

We, therefore, particularly point out and distinctly claim as our invention:

1. A turntable ball bearing assembly for power shovels, cranes and the like comprising a toroidal raceway, a plurality of bearing balls in said raceway, elastically deformable one-piece imperforate plastic spacers interposed between each of said balls operative resiliently to hold each of said balls in spaced apart relation in said raceway, each of said spacers having a central opening and oppositely directed coaxial ball seats with spherical ball contacting surfaces of a radius slightly larger than the radius of said balls, said ball contacting surfaces terminating in parallel rim faces extending normal to the axis of said raceway, said spacers gradually increasing in thickness from a minimum adjacent said central opening to a maximum between said parallel rim faces, such maximum thickness being substantially less than the diameter of said bearing balls, said spacers being adapted elastically to deform radially outwardly due to crowding action of said balls until the entire ball contacting surfaces engage the surfaces of said balls, and a completely circumferentially extending reinforcing means imbedded in each of said spacers substantially spaced from said spherical contacting surfaces and from the outer periphery of said spacers, said reinforcing means tending to maintain said spacers in one piece and, in the event that said spacers crack into radial segments during crowding action of said balls as aforesaid, maintaining said segments in annular form, thereby precluding said segments from becoming dislodged in said raceway.

2. A turntable ball bearing assembly as set forth in claim 1 wherein said reinforcing means comprises a single annular ring of circular section.

3. A turntable ball bearing assembly as set forth in claim 1 wherein said reinforcing means comprises a ring of rectangular sectional configuration having a greater radial dimension than axial dimension.

4. A turntable ball bearing assembly as set forth in claim 1 wherein said reinforcing means comprises an annular ring of rectangular sectional configuration having a greater axial dimension than radial dimension.

5. A turntable ball bearing assembly as set forth in claim 1 wherein said reinforcing means comprises a metallic helix.

6. A turntable ball bearing assembly as set forth in claim 1 wherein said reinforcing means comprises a metallic convolute.

References Cited by the Examiner
UNITED STATES PATENTS

| | | | |
|---|---|---|---|
| 2,873,151 | 2/1959 | Leister | 308—184 X |
| 2,897,021 | 7/1959 | Zeilman | 308—199 |
| 2,976,093 | 3/1961 | Reiling. | |
| 3,058,789 | 10/1962 | Ham | 308—199 |
| 3,097,026 | 7/1963 | Sernetz | 308—184 |

FOREIGN PATENTS 833,847  5/1960  Great Britain.

DON A. WAITE, *Primary Examiner.*
ROBERT C. RIORDON, *Examiner.*